United States Patent [19]
Byrd

[11] Patent Number: 6,047,743
[45] Date of Patent: *Apr. 11, 2000

[54] INTEGRATED HIGH PRESSURE FILL PORT AND FLOW CONTROLLER FOR CYLINDER RECHARGER

[75] Inventor: Gary Neal Byrd, Donahue, Iowa

[73] Assignee: Litton Systems, Inc., Woodland Hills, Calif.

[*] Notice: This patent is subject to a terminal disclaimer.

[21] Appl. No.: 09/083,975

[22] Filed: May 26, 1998

Related U.S. Application Data

[63] Continuation-in-part of application No. 08/797,823, Feb. 10, 1997, Pat. No. 5,908,053.

[51] Int. Cl.[7] .................. B65B 1/04; B65B 3/04
[52] U.S. Cl. .................. 141/18; 141/2; 141/4; 141/39; 141/348; 141/383; 137/614.06
[58] Field of Search .................. 141/2, 18, 21, 141/22, 3, 4, 20, 39, 311 R, 312, 346, 348, 349, 350, 363, 364, 367, 369, 370, 372, 378, 382, 383, 384, 386, 95; 137/614.06; 206/6

[56] References Cited

U.S. PATENT DOCUMENTS

| | | |
|---|---|---|
| 3,724,516 | 4/1973 | Elson et al. .................. 141/95 |
| 4,648,431 | 3/1987 | Strongert et al. . |
| 4,948,391 | 8/1990 | Noguchi . |
| 5,354,361 | 10/1994 | Coffield . |
| 5,368,067 | 11/1994 | Cook, Jr. .................. 137/485 |
| 5,370,112 | 12/1994 | Perkins .................. 128/204.21 |
| 5,402,665 | 4/1995 | Hart et al. . |
| 5,454,421 | 10/1995 | Kerger et al. .................. 141/18 |
| 5,520,214 | 5/1996 | Mack et al. . |
| 5,566,713 | 10/1996 | Lhomer et al. . |
| 5,908,053 | 6/1999 | Byrd .................. 141/18 |

FOREIGN PATENT DOCUMENTS

| | | |
|---|---|---|
| 1467704 | 4/1967 | France . |
| 2422900 | 11/1979 | France . |
| 815352 | 7/1949 | Germany . |

*Primary Examiner*—Steven O. Douglas
*Assistant Examiner*—Peter deVore
*Attorney, Agent, or Firm*—Lowe Hauptman Gopstein Gilman & Berner

[57] ABSTRACT

An apparatus for providing oxygen-enriched air at a first pressure and at a second pressure, the second pressure being greater than the first pressure. The apparatus comprises, in combination, a pressure swing adsorption system and a pressure intensifier. The pressure swing adsorption system for enriching the oxygen content of air has a pressure of at least the first pressure. The pressure swing adsorption system is adapted to provide oxygen-enriched air to a first outlet at the first pressure and to provide oxygen-enriched air to a pressure intensifier at the first pressure. The pressure intensifier pressurises the oxygen-enriched air and provides the oxygen-enriched air to a second outlet at the second pressure.

20 Claims, 12 Drawing Sheets

6,047,743

INTEGRATED HIGH PRESSURE FILL PORT AND FLOW CONTROLLER FOR CYLINDER RECHARGER

This is a Continuation-in-Part of Ser. No. 08/797,823 filed Feb. 10, 1997 now U.S. Pat. No. 5,908,053.

FIELD OF THE INVENTION

The present invention provides an oxygen concentrator and cylinder recharger and in particular provides a home health care oxygen concentrator and a cylinder recharger that is capable of simultaneously or independently providing oxygen-enriched air at a low pressure and at a high pressure. Such provision of oxygen-enriched air at two different pressures enables the apparatus to be utilized for the provision of oxygen-enriched air at a pressure suitable for use by a patient while at the same time providing oxygen-enriched air at a pressure suitable for recharging of a cylinder, thereby providing the patient with the option to be mobile.

BACKGROUND OF THE INVENTION

There are a number of instances where the provision of oxygen-enriched air, sometimes referred to as oxygen, is required to be provided at a low pressure. One particular situation where such low pressure oxygen-enriched air is required is in the health care field, both in the health care field within various institutions as well as within a patient's home. In such situations, it may be necessary to provide a continuous flow of low pressure oxygen-enriched air to a patient on an on-going basis. While such patients may be able to withstand the absence of the flow of oxygen-enriched air for short periods of time, such patients frequently are unable to withstand the absence of such a flow of oxygen-enriched air for longer periods of time without suffering major health problems. In particular, such patients are normally not able to move from one location to another without oxygen-enriched air.

Systems for the provision of a flow of low pressure oxygen-enriched air include distillation processes, adsorption separation processes and membrane separation processes. One such process is a so-called pressure swing adsorption (PSA) process which has the advantage of being able to provide oxygen-enriched air in a short period of time after the supply of a suitable feed gas e.g. compressed air, to the apparatus. An example of a pressure swing adsorption process is described in U.S. Pat. No. 4,948,391 of Y. Noguchi, which issued Aug. 14, 1990.

A typical pressure swing adsorption process applied to the provision of oxygen-enriched air could comprise the following steps:

a) introducing air under pressure into a cylinder having an adsorption column of an absorbent which selectively adsorbs nitrogen,
b) continuing the introduction of the air into the cylinder such that a zone of the adsorbed gas (nitrogen) moves forward through the cylinder,
c) collecting the desired gas (oxygen) that passes from the cylinder,
d) terminating the introduction of air to the cylinder,
e) terminating the collection of oxygen from the cylinder,
f) discharging a portion of the pressurized gas remaining in the cylinder, and
g) returning a portion of the oxygen back into the cylinder to flow through the column in the opposite direction to desorb the gas (nitrogen) adsorbed on the adsorbent and to purge the desorbed gas (nitrogen) from the cylinder.

Steps (a)–(e) effect the separation of nitrogen from the air so as to provide oxygen-enriched air, whereas steps (f) and (g) effect regeneration of the column used in the process. This permits continuous and long-term use of the pressure swing adsorption process to provide oxygen-enriched air.

One of the disadvantages of known processes for the supply of oxygen-enriched air at low pressure is that such processes lack the flexibility to allow the patient to be located at a fixed location but also to be able to move from that location with relative ease with an assurance that the source of oxygen-enriched air is sufficient. For instance, the patient may wish or need to is be able to move from a bed or other similar location, e.g. to use toilet facilities, prepare meals, go to another room or change locations for other reasons. Such mobility with existing processes generally requires a patient to be disconnected from a first source of low pressure oxygen-enriched air and to be re-connected to a second system for provision of such air and which is mobile e.g. a cylinder of oxygen-enriched air. The patient would want an assurance that the source of oxygen-enriched air is sufficient, which would be of particular concern if the patient wished to be mobile for an extended period of time e.g. a day or weekend, without having to re-fill the mobile, or ambulatory, cylinder at a dealer or distributor.

SUMMARY OF THE INVENTION

Apparatus has now been found that is capable of simultaneously providing low pressure oxygen-enriched air for use by a patient as well as high pressure oxygen-enriched air for the filling of a pressure cylinder.

Accordingly, one aspect of the present invention provides a high pressure fitting for filling a cylinder with a pressurized gas, said fitting comprising a fill port adaptor in combination with a flow controller system;

said fill port adaptor having a movable injection port, a cradle and a locking clamp;
said flow controller system having an inlet cooperatively adapted to receive said movable injection port, said flow controller and said fill port adaptor being open for flow of gas when said injection port is received in said inlet and closed for flow of gas when not so received; and
means to attach the flow controller system to a cylinder;
said locking clamp being adapted to lock the flow controller system in said cradle.

In a preferred embodiment of the invention, the high pressure fitting further comprises means to locate the flow controller system within the cradle so that the injection port and the inlet of the flow controller system are aligned.

In another embodiment, the said flow controller will not allow the flow of oxygen-enriched air through said high pressure fitting when said high pressure fitting is disconnected from said cylinder.

Another aspect of the invention provides an apparatus for filling a cylinder with a pressurized gas and for controlling flow from the cylinder, comprising:

a fill port adaptor having a movable injection port, a cradle and a movable lock clamp;
a flow controller system for adjusting a flow rate of gas flowing from the cylinder therethrough and having an inlet cooperatively adapted to receive said movable injection port, said movable injection port having an open position in which said adaptor and said flow controller system are in fluid communication and a closed position in which said adaptor and said flow controller system are not in fluid communication; and said locking clamp being adapted to lock the flow controller system in said cradle.

In a preferred embodiment of the invention, there is a valve mechanism associated with said adaptor and said flow controller and having an open position where the source of pressurized fluid fills the cylinder and a closed position where said flow controller can be open to permit fluid to flow from the cylinder through the flow controller to the atmosphere.

In a further embodiment, the valve mechanism comprises a movable valve and wherein said flow controller has a cooperating movable valve.

In embodiments of the apparatus and method of the present invention, the air separation system is a pressure swing absorption system, and the oxygen-enriched air from the pressure swing adsorption system is provided either simultaneously or independently to said pressure intensifier.

In another embodiment, the apparatus further comprises an air compressor for providing air to said pressure swing adsorption system, said air compressor having an inlet and exhaust air sound suppression system.

BRIEF DESCRIPTION OF THE DRAWINGS

The present invention is illustrated by the embodiments shown in the drawings in which.

DETAILED DESCRIPTION OF THE INVENTION

The low pressure oxygen-enriched air separation system may be an oxygen generator, a distiller, an air separator or a membrane separator, but it will be described herein with reference to the preferred embodiment in which it is a pressure swing absorption system.

Figure 1:
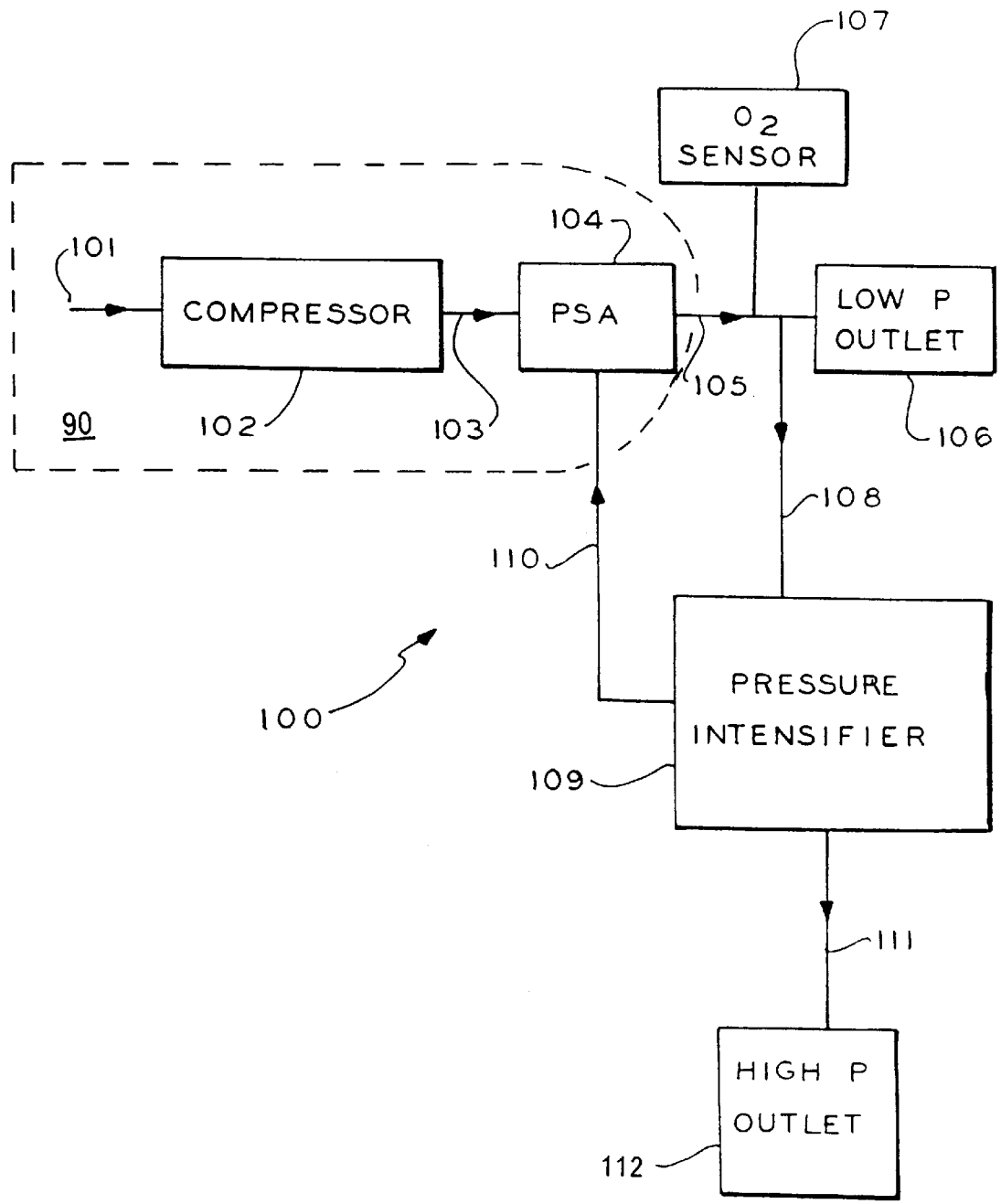
FIG. 1 is a schematic representation in block format of the apparatus of the invention.

FIG. 1 shows apparatus of the invention, generally indicated by 100, in block format. Ambient air 101 is connected to compressor 102. Outlet 103 from compressor 102 is connected to pressure swing adsorbed (PSA) 104 and pressure intensifier 109 (see FIG. 2). Outlet 105 from pressure swing adsorbed 104 is connected to oxygen sensor 107, low pressure outlet 106, and through tubing 108, to pressure intensifier 109. Pressure intensifier 109 is connected by tubing 111 to high pressure outlet 112, as well as being interconnected by tubing 110 to pressure swing adsorbed 104.

In operation, ambient air enters air inlet 101 and is pressurised in compressor 102. The pressurised air is fed to pressure swing adsorbed 104, as well as being fed to pressure intensifier 109 when the latter is energised (see FIG. 2). The oxygen-enriched air from pressure swing adsorbed 104 is monitored by oxygen sensor 107, as well as fed to low pressure outlet 106 for use by a patient. In addition, oxygen-enriched air is fed to pressure intensifier 109. Pressurised oxygen-enriched air is fed from pressure intensifier 109 to high pressure outlet 112 where it may be used to re-charge a cylinder of oxygen-enriched air.

Figure 2:
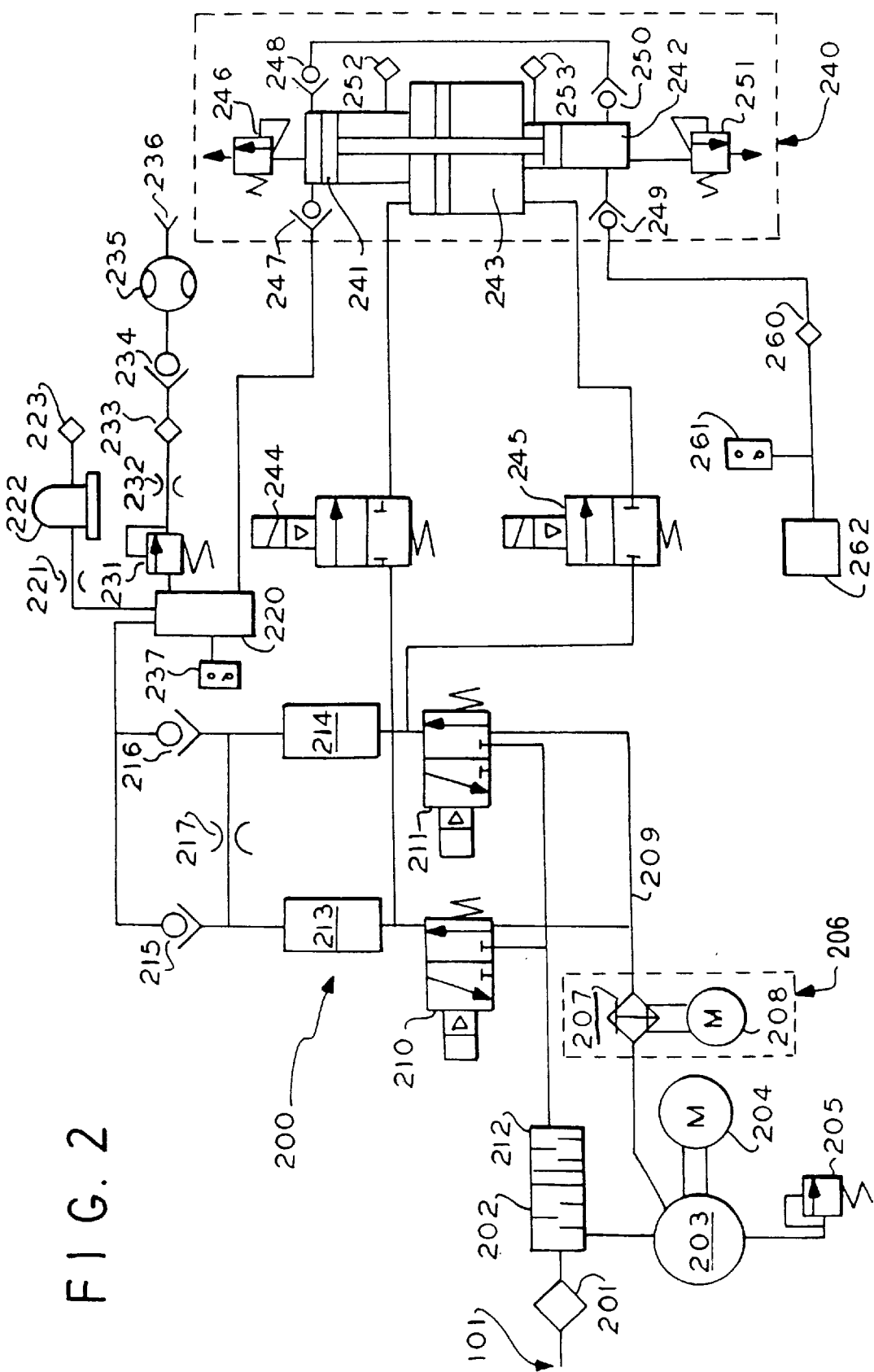
FIG. 2 is a schematic representation of the apparatus of FIG. 1.

FIG. 2 shows an embodiment of an apparatus of the invention, generally indicated by 200, in greater detail. Apparatus 200 has inlet 101 connected in turn to particulate filter 201, tuned resonator 202 and to the inlet to compressor 203. Compressor 203 is driven by motor 204, and has relief valve 205. The outlet from compressor 203 is connected to a heat exchanger, generally indicated by 206, which has heat exchanger section 207 and cooling fan 208. Outlet tubing 209 from heat exchanger 207 is connected to two solenoid valves, 210 and 211, which are in a parallel relationship.

Solenoid valves 210 and 211 are connected to a tuned resonator 212. Each of solenoid valves 210 and 211 is connected to a sieve bed, 213 and 214 respectively, which are also in a parallel relationship. Sieve beds 213 and 214 are molecular sieve beds. Each of the outlets of sieve bed 213 and 214 is connected to a check valve, 215 and 216 respectively. In addition, sieve bed 213 and 214 are interconnected through orifice 217, the interconnection being located between the outlet of each of sieve bed 213 and 214 and each of check valves 215 and 216.

The outlets from each of check valves 215 and 216 are joined together, and connected to oxygen plenum 220. Oxygen plenum 220 is connected through orifice 221 to oxygen sensor 222 and filter 223, which is vented to the atmosphere. Oxygen plenum 220 is also connected to low pressure switch 237. The outlet of oxygen plenum 220 is connected in turn to pressure regulator 231, through orifice 232, filter 233, check valve 234, flow meter 235 to patient outlet 236. Patient outlet 236 is a low pressure outlet i.e. the pressure would normally be only a few inches of water, as will be understood by persons skilled in the art.

The outlet of the oxygen plenum 220 is also connected to a pressure intensifier generally indicated by 240. Pressure intensifier 240 has a first stage cylinder 241 and a second stage cylinder 242, with drive air cylinder 243 located therebetween. The opposed sides of drive cylinder 243 are connected through solenoid valves 244 and 245 to tubing between solenoid valve 210 and sieve bed 213, and tubing between solenoid valve 211 and sieve bed 214, respectively, of the pressure swing adsorbed. Check valve 247 is located between oxygen plenum 220 and first stage cylinder 241. First stage cylinder 241 is also connected through check valve 248 and check valve 250 to second stage cylinder 242. Rupture disc 246 is attached to first stage cylinder 241 and rupture disc 251 is attached to second stage cylinder 242. Filters 252 and 253 are connected to first stage cylinder 241 and second stage cylinder 242, respectively, and vented to the atmosphere.

Check valve 249 is connected to filter 260, pressure switch 261 and pressure connection 262, which is the high pressure connection.

In an example of a typical operation of the embodiment of FIG. 2, air enters air compressor 203 through inlet 101, particulate filter 201 and tuned resonator 202. Tuned resonator 202 is for sound suppression of compressor 203. The air is compressed to the operating pressure e.g. a pressure ranging from 20 to 30 psig. The compressed air obtained is routed through a fan cooled tube and fin heat exchanger 206 which cools the air before it enters the molecular sieve beds 213 and 214. The cooling of the air from the compressor optimizes performance of the molecular sieve beds as well as cooling the oxygen-enriched air obtained from the beds before it reaches the patient. Air flow into and out of the beds is controlled by two solenoid valves (valve 210 and valve 211) which allow compressed air to either enter the bed or to be vented from the bed to atmosphere.

A normal three phase cycle is (i) a first filling phase to fill bed 213 and exhaust bed 214, (ii) an intermediate overlap phase and (iii) a second filling phase to fill bed 214 and exhaust bed 213.

In phase (i), solenoid valve 210 allows compressed gas to enter bed 213 while valve 211 is venting gas from bed 214 to atmosphere. The molecular sieve in bed 213 adsorbs water vapour and nitrogen from the compressed air, allowing oxygen and argon to pass through the sieve. A portion of the gas is used as product gas which is delivered to the patient as low pressure oxygen-enriched air. The remainder of the oxygen-enriched air passes through an orifice, 217, and purges nitrogen and water vapour out of bed 214 as it is vented to atmosphere through solenoid valve 211. At the end of this phase, which in a typical embodiment of the invention lasts approximately 8 seconds, the pressure in bed 213 is typically approximately 30 psig and in bed 214 it is typically slightly above zero psig. At this time, bed 213 is almost saturated with nitrogen and continued flow through this bed without purging would result in nitrogen breakthrough and loss of purity in the product gas.

In overlap phase (ii), there is an overlap of approximately 1.6 seconds in which both solenoid valves 210 and 211 are switched to allow flow into both molecular sieve beds. This allows the air from sieve bed 213, initially at approximately 30 psig, as discussed above, to back flow through solenoid valve 210 into bed 214 which is initially at a low pressure. The crossflow of air in addition to the air from compressor provides a quick charge of bed 214, thereby reducing the compressor flow requirements and improving the efficiency of the system. At the end of the overlap cycle, the pressure in both beds is typically approximately 20 psig.

At the end of the overlap phase i.e. in phase (iii), solenoid valve 210 is switched to the vent position allowing bed 213 to vent to atmosphere until the pressure is only slightly above zero. venting the bed to atmosphere plus back filling with product gas from bed 214 purges nitrogen and water vapour from bed 213 in preparation for the next cycle. At the same time bed 214 is providing product gas to the patient and purging bed 213. At the end of this phase, the entire cycle is repeated.

The oxygen-enriched air from the sieve beds passes through check valves 215 and 216 into the product storage (oxygen plenum 220). From oxygen plenum 220, the oxygen-enriched air passes into pressure regulator 231, through flow control orifice 232, HEPA filter 233 and check valve 234 to flow meter 235. Regulator 231 reduces the pressure from, for example, 30 psig in the oxygen storage plenum 220 to a constant pressure e.g. 6 psig, at the inlet of flow meter 235. Flow meter 235 is adjustable by the patient to provide the prescribed flow rate of oxygen at very low pressure.

A small amount of gas from the plenum e.g. typically less than 250 cc per minute, is continuously monitored by the oxygen sensor to ensure that the oxygen purity is above a predetermined value e.g. 90%. If the purity is below the predetermined or threshold value, a microprocessor energises a warning light to alert the patient that an equipment malfunction has occurred and to prevent cycling of the pressure intensifier.

Pressure intensifier 240 may be standard two-stage device with a drive air cylinder and first and second stage product gas cylinders. The intensifier is turned on by opening solenoid valve 244 and 245 and which are either both open or both closed. A typical pressure intensifier cycle is as follows:

1. In the first step of the cycle, drive air enters drive air cylinder 243 through solenoid valve 244 beginning at the start of the overlap cycle of the molecular sieve beds discussed above, which occurs just before bed 213 starts charging, and continuing through the bed 213 charging cycle. This causes the piston to shuttle, drawing product gas into first stage cylinder 241 through check valve 247 and compressing the oxygen-enriched air in the second stage cylinder 242 which exits through check valve 249.

2. The drive air cylinder supply is common to the sieve bed supply and controlled by the sieve bed solenoid valves. Thus, the air in drive air cylinder 243 also helps precharge the sieve beds during the overlap phase which further increases the efficiency of the system. In this step during the overlap phase, the air in the drive air cylinder 243 back flows through solenoid valve 244, backflows through solenoid valve 210 and back into bed 214 through solenoid valve 211.

3. When the bed solenoid valves cycle, ambient air enters drive air cylinder 243 through solenoid valve 245 causing the piston to shuttle compressing the oxygen enriched air in the first stage cylinder 241. This gas then passes through check valves 248 and 250 and enters the second stage cylinder. The drive air, entering through solenoid valve 245 in this side of the drive air cylinder 243 aids in precharging bed 213 during the overlap cycle, as previously described.

After leaving the pressure intensifier, the gas passes through a filter 260 and the high pressure coupling 262 before entering a pressure vessel (not shown). The pressure intensifier will continue to operate until the pressure is high enough to activate a pressure switch 261 in the product line which signals the controller to close solenoid valves 244 and 245.

An example of apparatus for monitoring gaseous oxygen concentration is shown in U.S. Pat. No. 5,402,665 of R. F. Hart et al, which issued Apr. 4, 1995. An example of a pressure swing adsorbed system having a pneumatically driven booster compressor is shown in U.S. Pat. No. 5,354, 361 of K. M. Coffield, which issued Oct. 11, 1994.

In embodiments of the present invention, the first pressure is in the range of 5–10 psi and the second pressure is in the range of up to 3000 psi. The apparatus of the present invention is particularly adapted to be capable of providing both first and second pressures simultaneously.

The oxygen content of the oxygen-enriched air may be varied over a wide range but is preferably at least 85% by volume. In preferred embodiments, the oxygen content is at least 90% by volume, especially in the range of 92–94% by volume.

The oxygen concentrator described herein utilizes a pressure intensifier to raise the pressure of a portion of the oxygen-enriched air to a suitable pressure e.g. 2000 psig, for storage in pressure vessels e.g. a cylinder, for use by ambulatory patients. It will be understood that when the cylinder is empty, the pressure intensifier will provide oxygen-enriched air at a relatively low pressure, for instance, about the pressure in the storage plenum e.g. 30 psig, but that this pressure will rise as the cylinder fills e.g. to the aforementioned 2000 psig.

While the oxygen concentrator may be operated so as to produce oxygen-enriched air having a content of, for example, 93% oxygen, and thereby meet certain regulations relating to the provision of oxygen-enriched air for patients, such oxygen-enriched air may not meet the specifications for a medical-grade oxygen. Thus cylinders with adaptors meeting regulations for medical-grade oxygen may not be able to be used with the oxygen concentrator. Nonetheless, a unique integrated high pressure fitting and flow controller is preferred, that allows the patient to easily and safely fill their cylinders with oxygen-enriched air e.g. 93% oxygen, from the concentrator. Such a high pressure fitting and flow controller is shown in FIGS. 3–11.

Figure 3:
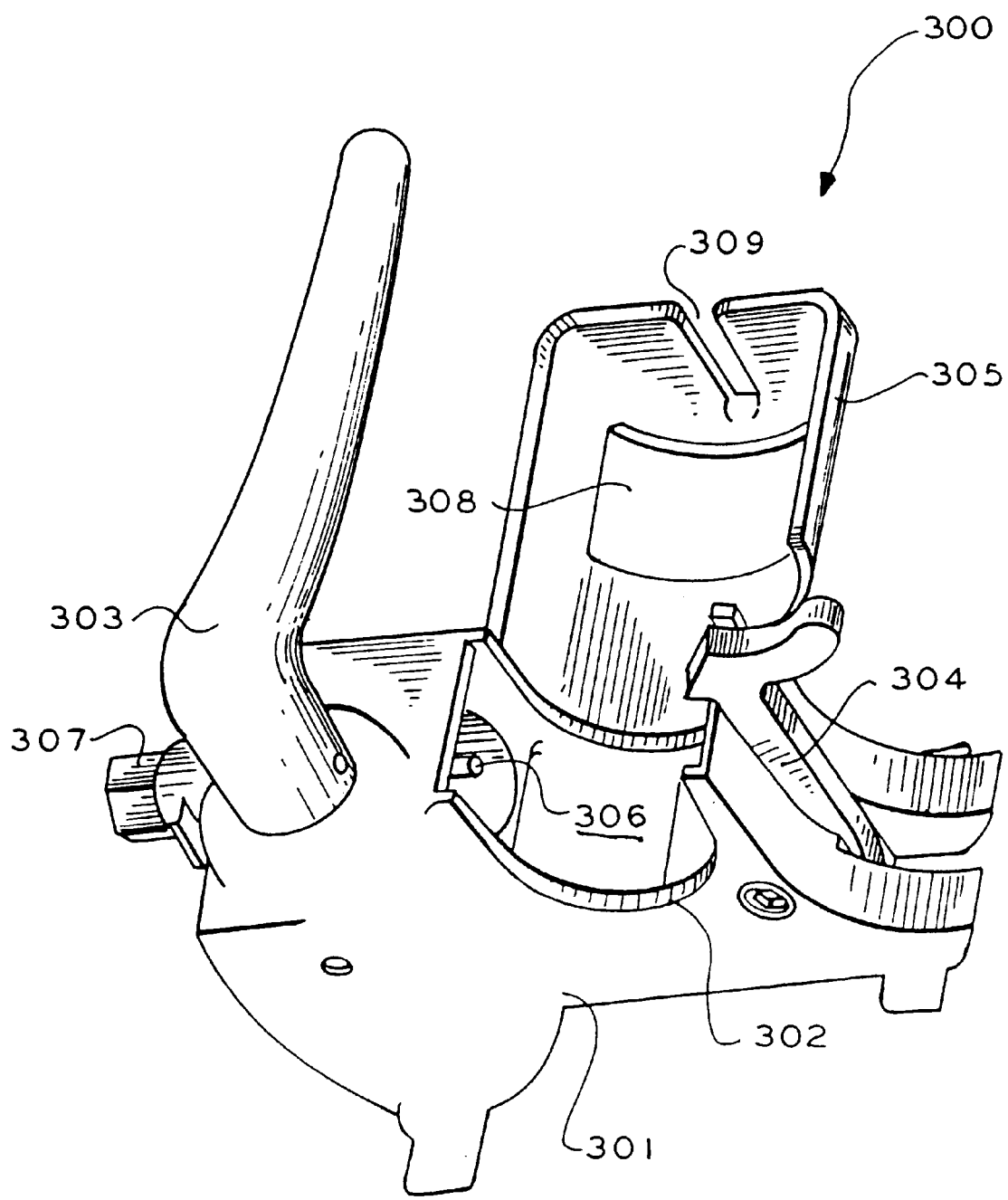
FIG. 3 is a schematic representation of a fill port adaptor body.
Figure 5:
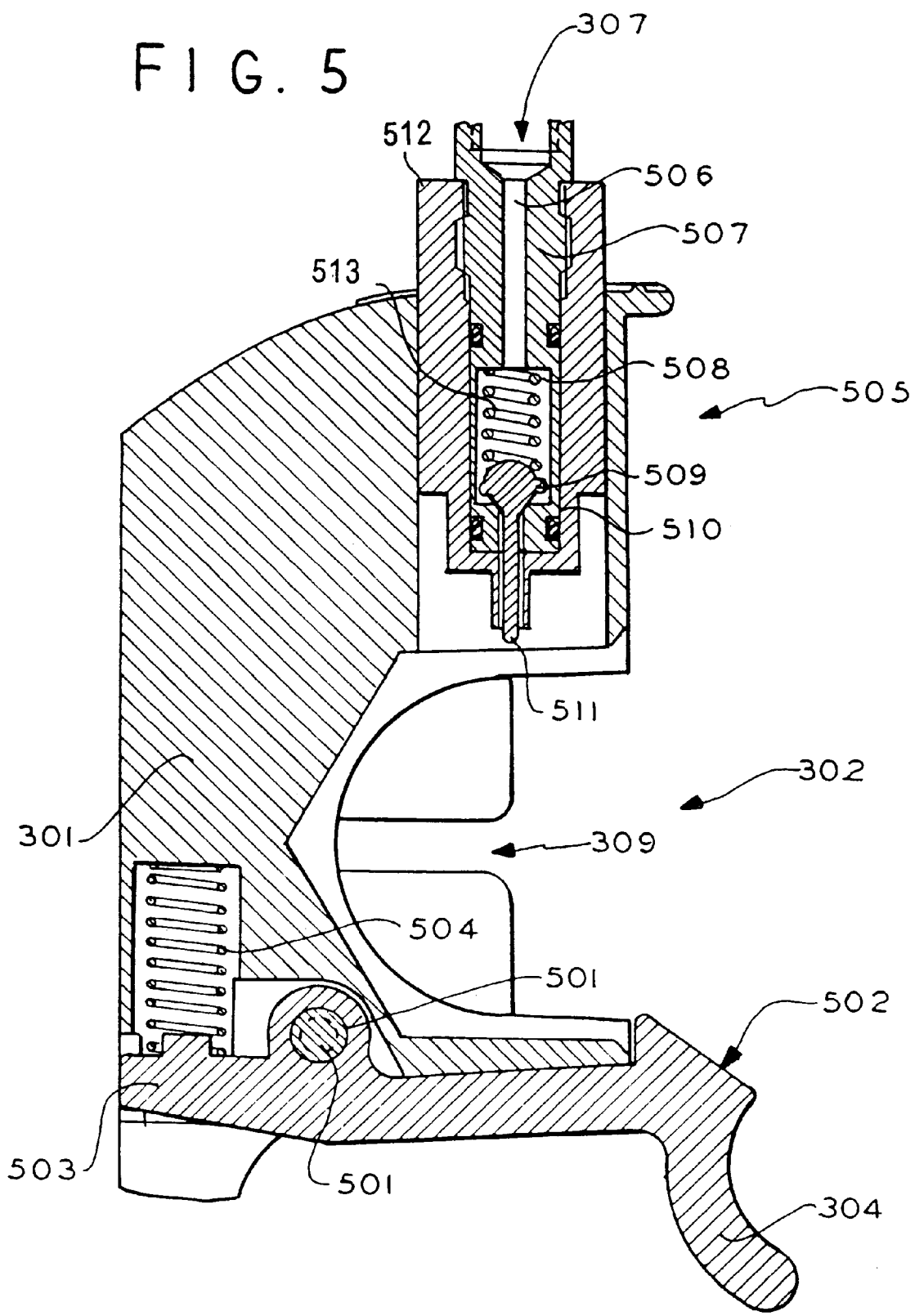
FIG. 5 is a schematic representation of a cross section of the fill port adaptor body through lines A—A of FIG. 4.

FIG. 3 shows a perspective view of a fill port adaptor body, generally indicated by 300. Fill port adaptor body 300 has a housing 301 with integral cradle 302, handle 303, locking clip 304 and adaptor housing 305. Cradle 302 of housing 301 is adapted to accept the flow controller body described herein below. Cradle 302 has fill port adaptor 306 therein, which is further shown in FIG. 5. Fill port adaptor 306 is connected to handle 303, and is movable into cradle 302 using handle 303. Adaptor 307 extends from housing 301 from the opposed side thereof to fill port adaptor 306, and is interconnected therewith as shown in FIG. 5.

Locking clip 304 is intended to retain the flow controller body within cradle 302, as described below. Latching of the flow controller body into cradle 302 occurs automatically when the flow controller body of a cylinder is placed in the cradle. However, an operator must manually move locking clip 304 into a release position to remove the cylinder. Similarly, handle 303 must be moved before the flow controller body of a cylinder may be placed in cradle 302 or removed therefrom, to reduce risk of damage to fill port adaptor 306.

Adaptor housing 305 is open on its upper face, as illustrated, and has housing window 308 on the opposed side thereof. The end of adaptor housing 305 opposed to cradle 302 has housing slot 309 therein.

Figure 3A:
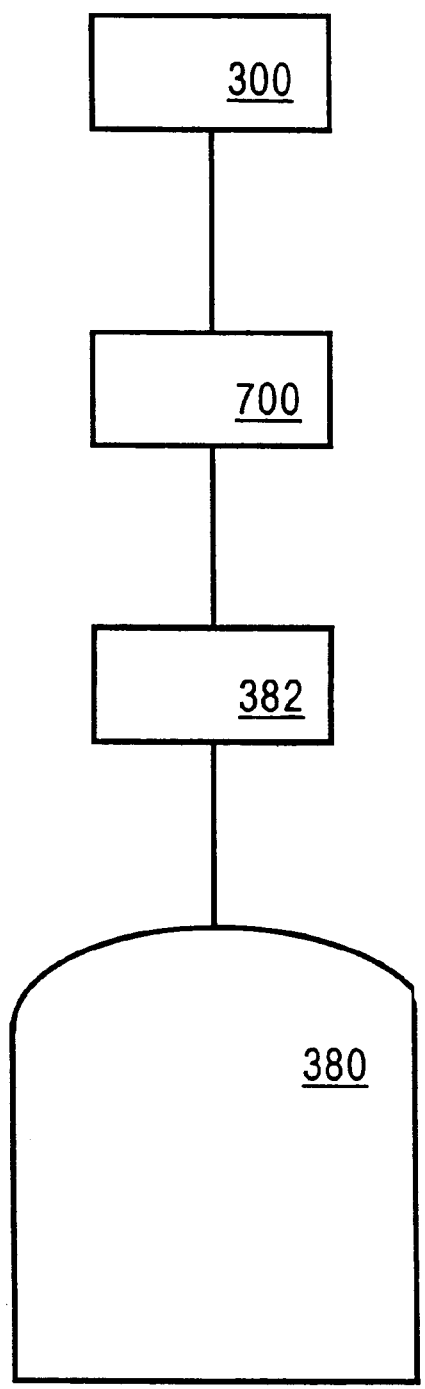
FIG. 3A is a schematic representation of a system for filling a cylinder and for permitting flow from a charged cylinder to a patient according to the present invention.

FIG. 3A is a schematic block diagram depicting a high pressure cylinder 380 connected to a step down high pressure regulator 382. The regulator 382 regulates high pressure oxygen-enriched air within cylinder 380 to a pressure of approximately 22 psig. The conventional flow controller 700 (described in detail below) utilizes inlet gas at approximately 22 psig to flow through any one of a plurality of fixed orifices, each of which provides a predetermined flow rate (e.g., 1 liter per minute (LPM), 2 LPM, 3 LPM, 4 LPM and so forth).

Figure 4:
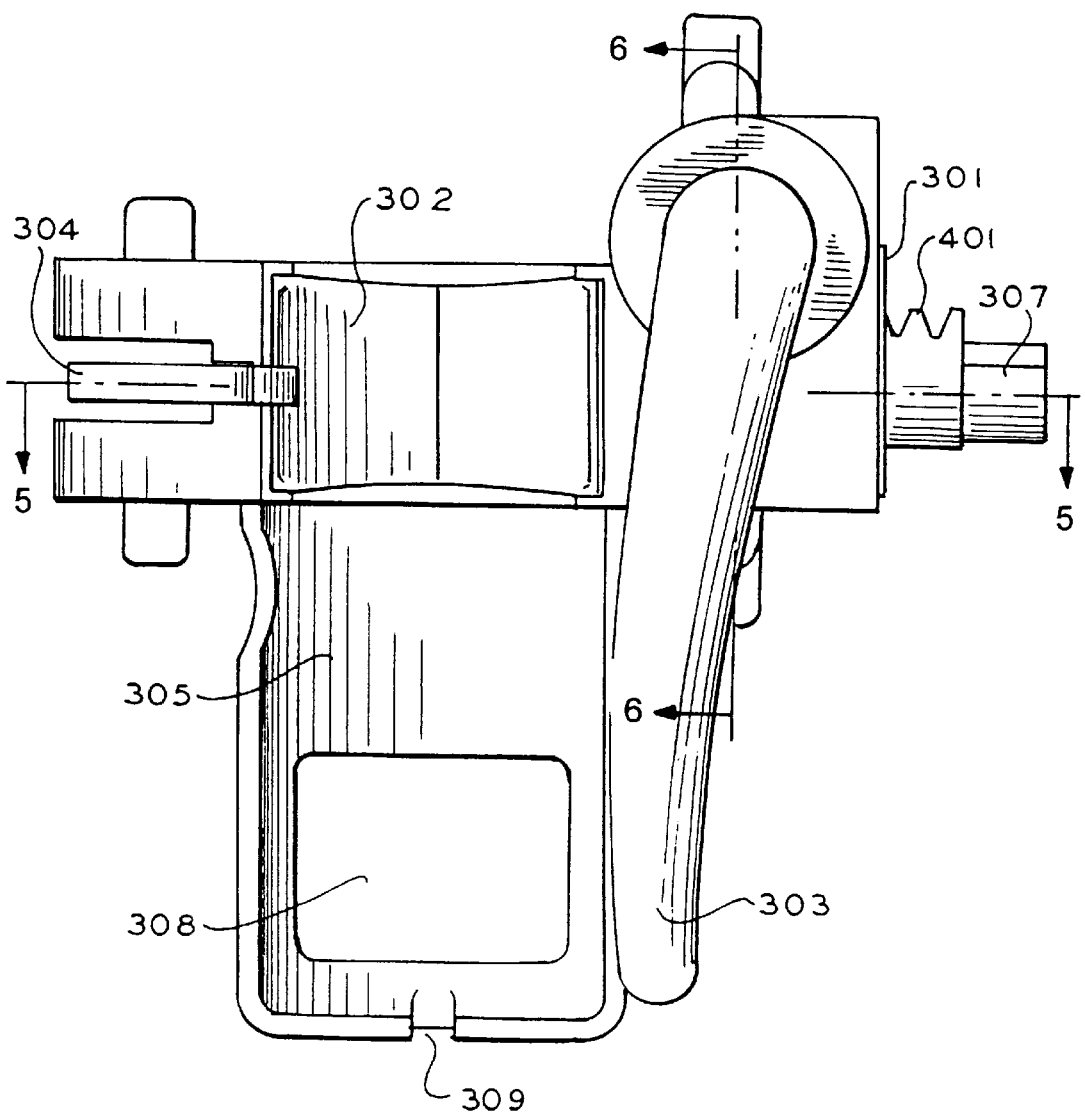
FIG. 4 is a schematic representation of a plan view of the fill port adaptor body.

FIG. 4 is a plan view of fill port adaptor port 300. Handle 303 is located on housing 301, and is adjacent to cradle 302. Locking clip 304 is shown as extending into cradle 302. Cradle 302 has adaptor housing 305 extending therefrom and in an aligned relationship. Adaptor housing 305 has housing window 308 therein, with housing slot 309 in the end thereof. FIG. 4 shows that adaptor 307 is connected to gear rack 401 which extends into housing 301.

FIG. 5 shows a cross section of fill port adaptor body 300 through line A—A. Locking clip 304 is pivoted about locking clip pivot 501. Locking clip spring 504 located within housing 301 biases locking clip base 503 in an outwards direction so that locking clip lip 502 is biased into to cradle 302 to lock the flow controller body therein.

A fill port adaptor, generally indicated by 505 in FIG. 5, is on the opposed side of cradle 302 to locking clip 304.

Figure 6:
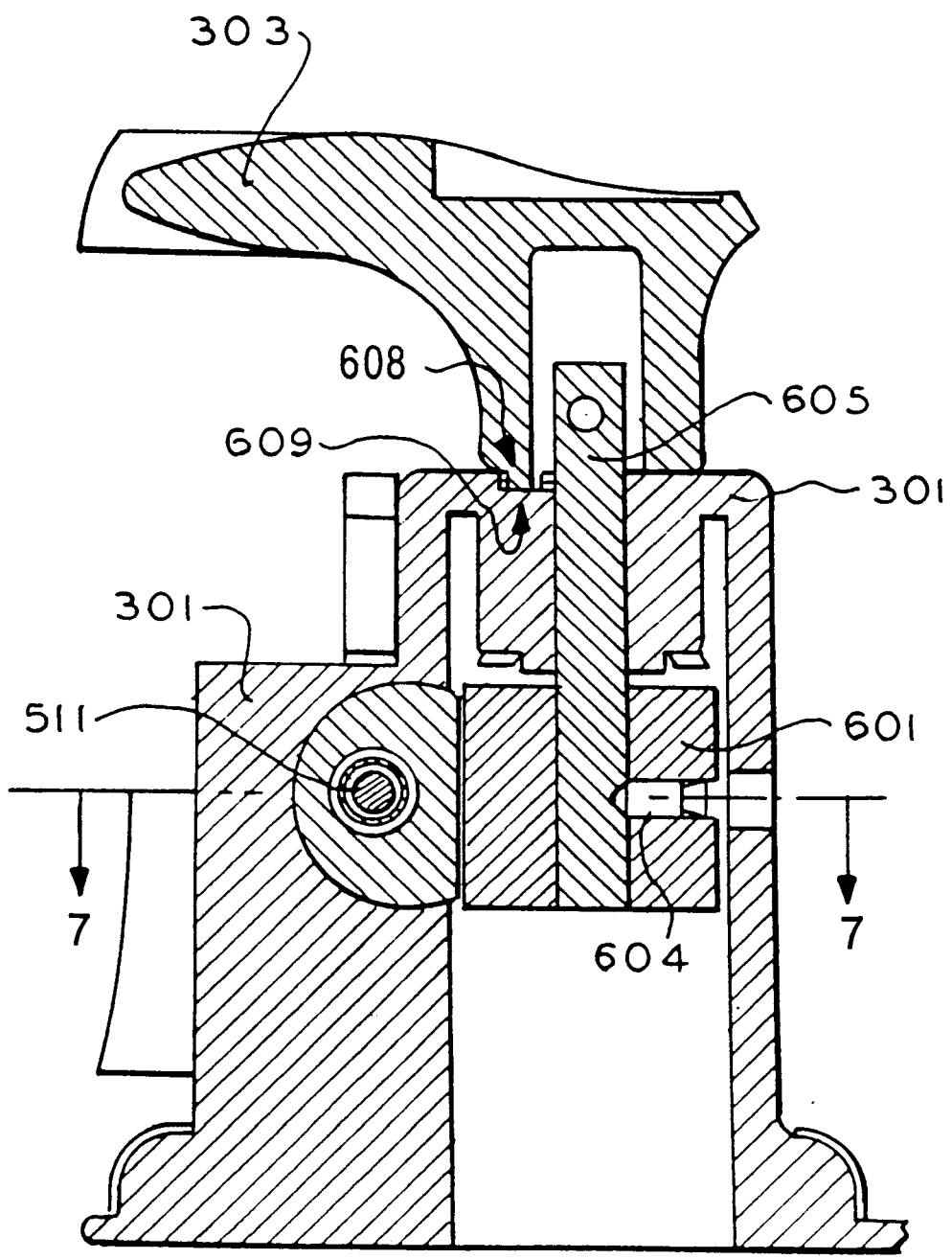
FIG. 6 is a schematic representation of a cross section of the fill port adaptor body through lines D—D of FIG. 4.

Fill port adaptor 505 extends from adaptor 307 to adaptor pin 511. Adaptor 307 is connected to adaptor channel 506 which is located within adaptor channel housing 507 which in turn is located within adaptor housing 512. Gear rack 401, shown in FIG. 4 and FIG. 6 is machined into adaptor housing 512. As discussed herein, adaptor housing 512 is movable with respect to housing 301. Adaptor channel 506 connects with spring chamber 513 in which is located adaptor spring 508 and check valve base 509. Check valve base 509 extends through check valve seat 510 and terminates in adaptor pin 511. In the retracted position as shown in FIG. 5, adaptor pin 511 is within housing 301, but in the engaged position the adaptor pin extends into cradle 302.

FIG. 6 shows a cross section of the adaptor body shown in FIG. 4, through D—D. Handle 303 is located on housing 301. Shaft 605 extends downward from handle 303 and connects handle 303 to pinion 601; pinion 601 is more clearly seen in FIG. 7, and is attached to shaft 605 by screw 604. Rotation of handle 303 causes rotation of pinion 601. Handle 303 has, on its lower side, handle projection 608, which is shown as being located in indent 609 in housing 301. Indent 609, and a similar indent that is not shown, serve to position and retain handle 303 in predetermined locations.

In a preferred embodiment, indent 609 has an adjustable screw therein (not shown), such screw being tapered or having a shoulder thereon. Projection 608 contacts the adjustable screw, on said taper or shoulder. Adjustment of the position of the screw adjusts the location of the taper or shoulder, and hence radially adjusts the position at which handle 303 is positioned and retained. This permits precise adjustment of the positioning of the fill port adaptor.

Figure 7:
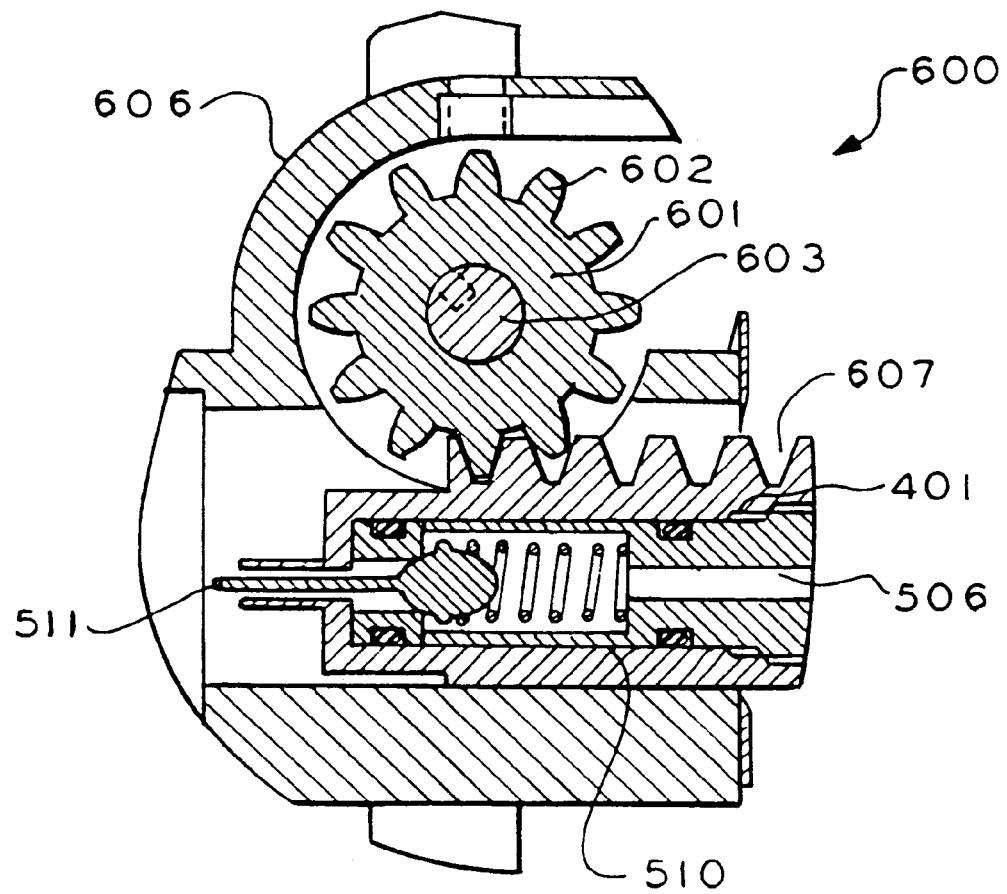
FIG. 7 is a schematic representation of a cross section of a part of the fill port adaptor of FIG. 6, through B—B.

FIG. 7 shows the rack and pinion, generally indicated by 600. Rack and pinion 600 has pinion 601 with pinion cogs 602. Pinion 601 rotates about pinion shaft 603, which extends down from handle 303, forming part thereof, as discussed above. Pinion 601 is located within pinion housing 606 which is part of housing 301. Pinion cogs 602 intermesh with ratchet slots 607 of ratchet 401. Ratchet 401 forms part of adaptor channel housing 507 illustrated in FIG. 5.

Figure 8:
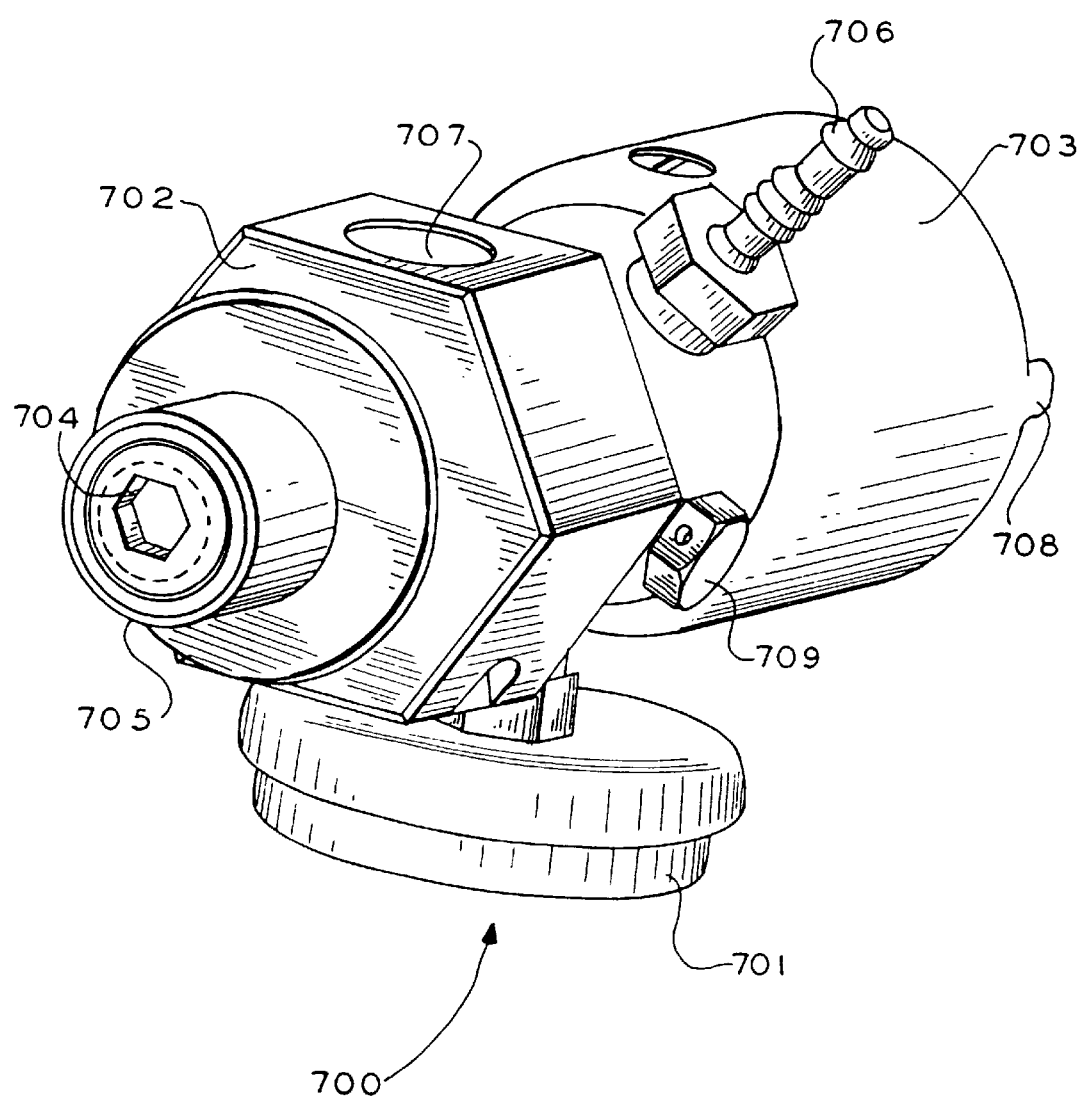
FIG. 8 is a schematic representation of a perspective view of a flow controller body.

FIG. 8 illustrates the flow controller body, generally indicated by 700. Flow controller body 700 has pressure gauge 701, rupture disc housing 709, outlet fitting 706, and flow restrictor 704. Outlet fitting 706 is adapted to receive a flexible hose. The body is adapted to be threaded onto the high pressure regulator 382 (FIG. 3A) or onto the high pressure cylinder 380 by threaded port 705, flow restrictor 704 being located within threaded port 705. Flow controller body 700 has an integral cradle housing 702 which is shaped and dimensioned to fit precisely in the cradle 302 (see FIG. 3). A flow control (ON/OFF) knob 703 with mechanical alignment/interlock bar 708 is attached to flow controller body 700 at the end opposed to the threaded port 705. Fill port adaptor inlet 707 is located in integral cradle housing 702.

Figure 9:
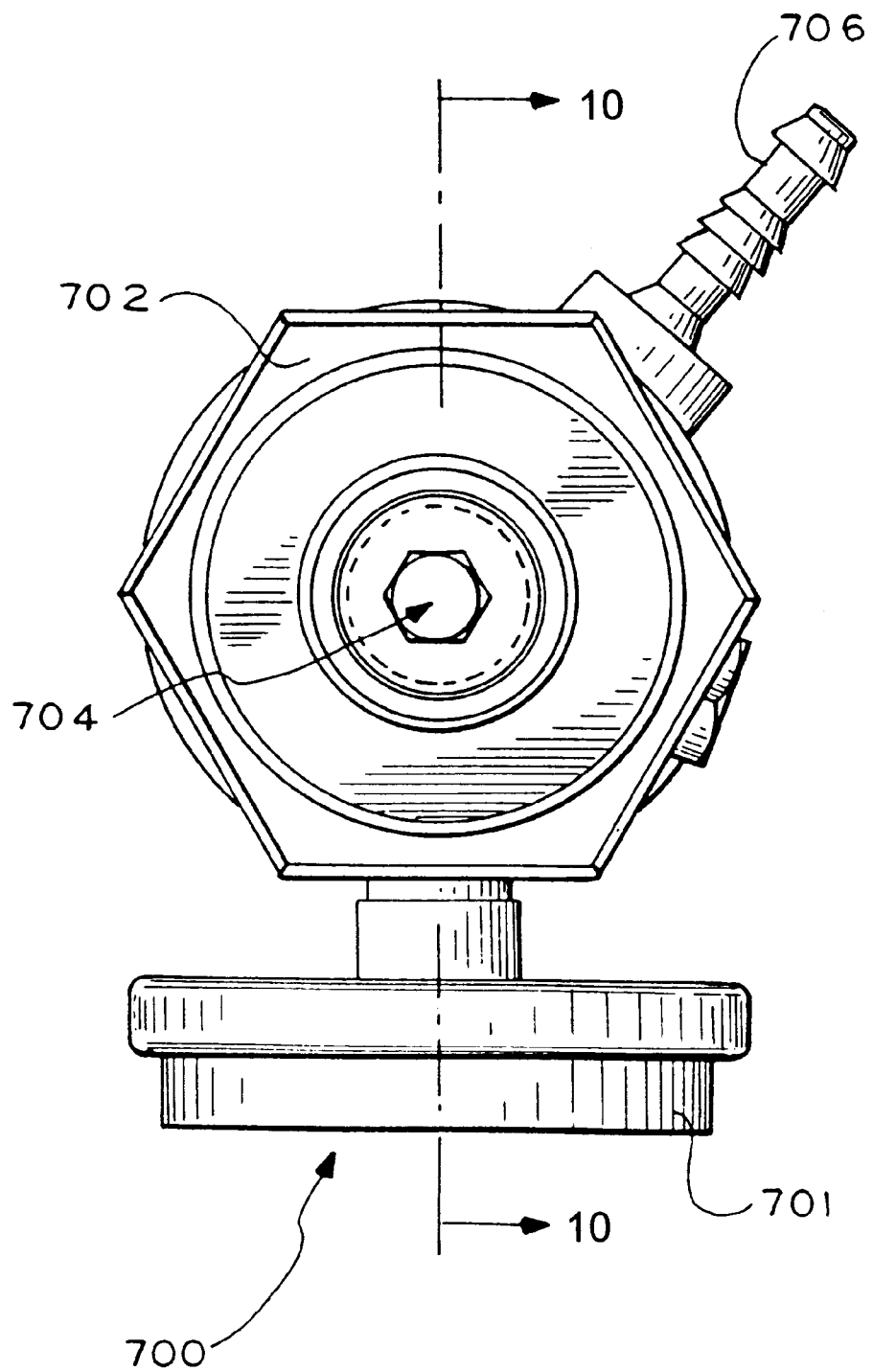
FIG. 9 is a schematic representation of an end view of the flow controller body of FIG. 8.

FIG. 9 shows an end view of flow controller body 700. Flow controller body 700 has flow restrictor 704 in the end thereof. Pressure gauge 701 and outlet port 706 are shown at an angle.

Figure 10:
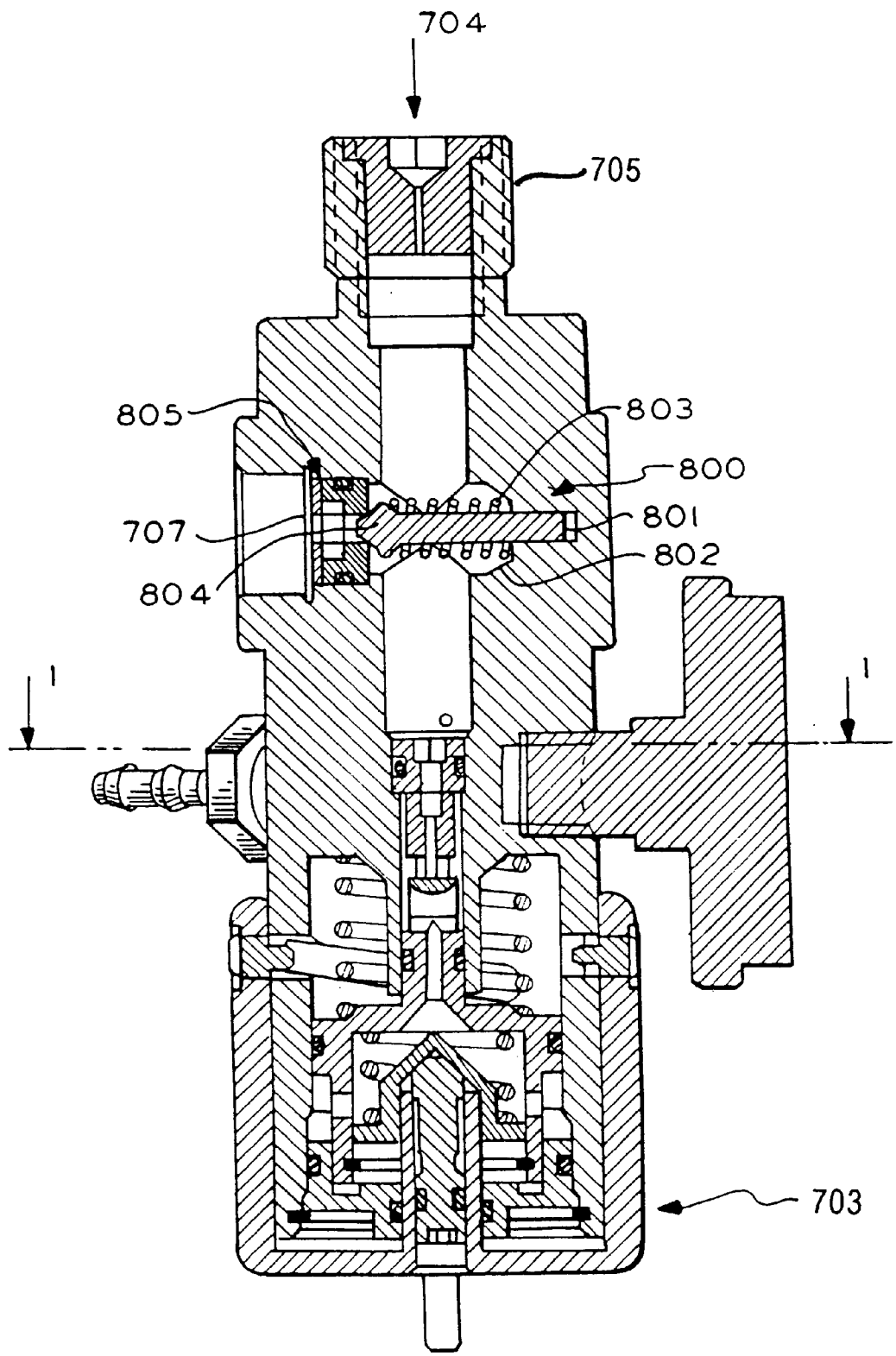
FIG. 10 is a schematic representation of a cross section of the flow controller body of FIG. 9 through line A—A.

FIG. 10 shows a cross section of flow controller body 700 through line A—A of FIG. 9. Adaptor inlet 707 has inlet valve 800. Inlet valve 800 has inlet valve stem 801 located within inlet valve chamber 802, but it will be noted that as illustrated inlet valve stem 801 does not extend fully to the end of inlet valve chamber 802. Inlet valve stem 801 has inlet valve spring 803 which biases valve end 804 towards valve seat 805 thereby biasing the valve toward a closed position.

In operation, flow controller body 700 is attached to a cylinder, not shown, through threaded cylinder port 705. Flow controller body 700 would normally be located on a cylinder, and remain thereon although it can be removed if desired. The cylinder with flow controller body 700 thereon is placed into fill port adaptor body 300 which forms part of the oxygen concentrator. Cradle housing 702 is adapted to fit within cradle 302 of fill port adaptor body 300. Alignment/interlock bar 708 on flow controller body 700 fits into housing slot 309 on adaptor housing 305. Flow controller knob 703 must be in the OFF position in order to insert alignment/interlock bar 708 into housing slot 309. This locates the rupture disk opposite housing window 308, but also locates inlet valve 800 opposite fill port adaptor 306. In order to insert flow controller body 700 into cradle 302, it is necessary to move locking clip 304 away from fill port adaptor 300, but after flow controller body 700 has been inserted into cradle 302, locking clip 304 biases back and locks flow controller body 700 in position.

Handle 303 is then tilted, rotated and locked in position, with handle projection 608 of handle 303 engaging in indent 609 in housing 301, at which time adaptor 306 moves inwards into cradle 302. In doing so, fill port adaptor 306 is inserted into adaptor inlet 707, with adaptor pin 511 contacting valve end 804. This moves valve end 804 away from valve seat 805, thereby opening the valve. However the amount of movement of valve end 804 is limited, thereby also causing check valve 509 to open. This forms a channel for the flow of oxygen-enriched air from the oxygen concentrator through fill port adaptor body 300, flow controller body 700, and out of cylinder port 704 into the cylinder. The cylinder cannot be removed without moving handle 303 such that fill port adaptor 306 becomes retracted. This disconnects the fill port adaptor so that the oxygen concentrator is not connected to the cylinder, and closes both the cylinder and the oxygen concentrator check valves 804 and 509, to prevent the flow or leakage of gas therefrom. In particular, the check valve in the fill port adaptor, 509, prevents gas from oxygen plenum 220 from escaping to atmosphere through check valves 247–250 in the pressure intensifier when the pressure intensifier is not in operation. A single movement of handle 303 opens or closes the channels for flow of high pressure air to the cylinder.

It will be appreciated that the flow controller body permits the use of cylinders of various sizes to be filled using the concentrator described herein.

It is to be understood that the oxygen concentrator described herein may be operated in a mode in which oxygen-enriched air is only supplied to a patient. Alternatively, the oxygen concentrator may be operated in a mode in which oxygen-enriched air is only supplied for the re-charging or filling of a cylinder. However, the oxygen concentrator also may be operated in a dual mode, supplying oxygen-enriched air to a patient and simultaneously supplying oxygen-enriched air for recharging or filling of a cylinder.

Figure 11A:
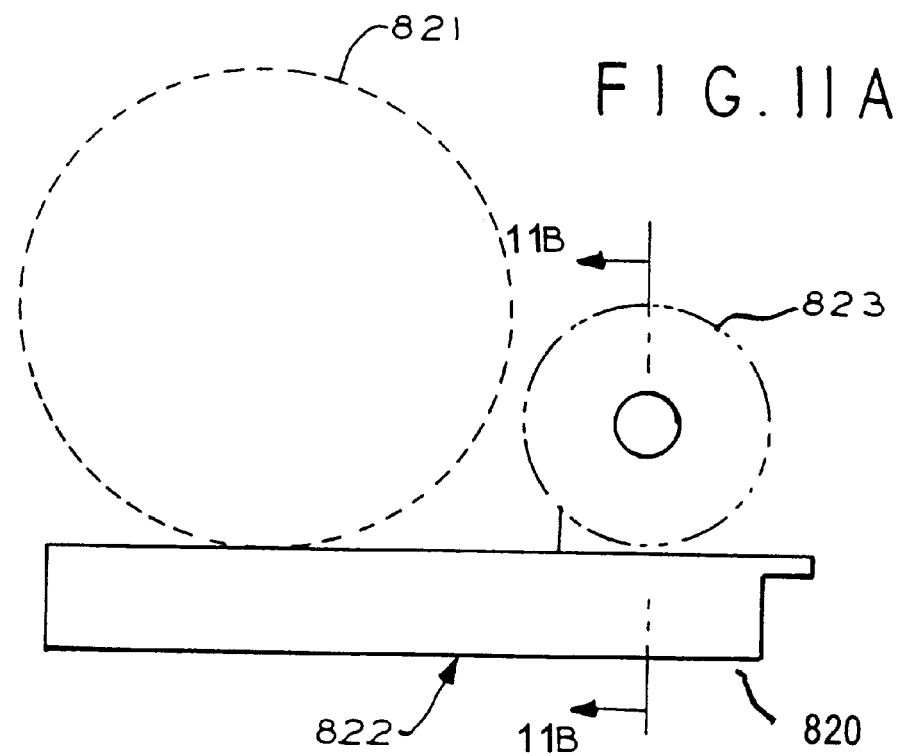
FIG. 11A is a schematic representation of a compressor system.

FIG. 11A shows a compressor system, generally indicated by 820. Compressor system 820 has compressor 821 mounted on base 822. Base 822 also has an integral sound suppressor 823 for suppressing noise from both air drawn into the compressor and air exhausted from the concentrator. The integral sound suppressor assists in reducing the size and complexity of the compressor system and permits the suppressors to be mounted in the base, thus reducing the manufacturing steps required in the fabrication of the oxygen concentrator. Sound suppressor 823 is more clearly shown in cross-section, through B—B, in FIG. 11B.

Figure 11B:
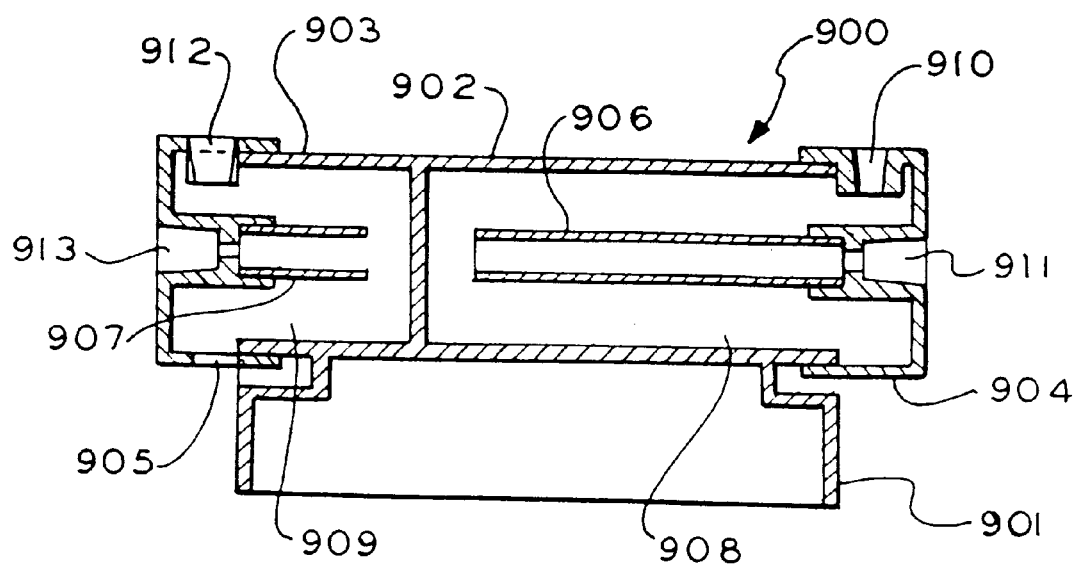
FIG. 11B is a schematic representation of a compressor sound suppression system, through line B—B of FIG. 11A.

FIG. 11B illustrates air compressor sound suppressor, generally indicated by 900. Sound suppressor 900 has compressor base 901 into which two outer silencer tubes 902 and 903 have been moulded, utilizing the natural contour of the air compressor. End caps 904 and 905 along with inner silencer tubes 906 and 907 are attached to each end of the compressor base silencer tubes 902 and 903. Compressor port 910 is adapted to be connected to an air compressor.

Operation of the sound suppressor can be described as follows:

As air is drawn into an air compressor, valve noise and air noise is generated. In more general terms, noise is generated when compressed air is exhausted to atmosphere in any pneumatic device.

In air compressor sound suppressor 900, compressor port 910 is connected to an air compressor and air is drawn into silencer tube chamber 908, which is moulded into the compressor base 901, via inlet port 911 in the end cap 904. The air travels through inner silencer tube 906 and into the inlet silencer chamber 908. Noise coming from the air compressor is muffled, because as sound travels from the air compressor and into compressor port 910, the noise is adsorbed and deflected through outlet silencer chamber 909 by the outer silencer tube 902 and the inner silencer tube 906 before exiting through outlet 911. By varying the diameter and length of outer silencer tube 902 and inner silencer tub 906, sound compressor 900 can be tuned to minimize the unwanted noise from the compressor.

The concentrator exhaust silencer operates in a similar manner as the inlet silencer except exhaust air noise is minimized. Air enters the silencer tube 903 through exhaust inlet 913 in end cap 905. Noise coming from the exhaust air is muffled, because as air travels through inlet exhaust inlet 913, the exhaust air noise is absorbed and deflected by the inner silencer tube 907 and outer silencer tube 903 before exiting through outlet 912. By varying the diameter and length of the outer silencer tube 903 and inner silencer tube 907, sound suppressor 900 can be tuned to minimize the unwanted exhaust air noise.

It is understood that the air compressor may be mechanically or an electrically driven compressor, or any other mechanism that compresses air for introduction into the oxygen enrichment portion of the apparatus.

The apparatus described herein may be used to fill cylinders of a variety of different sizes and configurations by providing suitable adaptors to the oxygen fill port adaptor, including use of adaptors to fill stationary cylinder which would not otherwise fit into the fill port. For example, a flow controller body may be adapted to fit in the fill port adaptor 300 and to be connected via a high pressure hose to a flow controller body 700 on a cylinder which is not, itself, contained with the fill port adaptor. The substitute flow controller body may be used to otherwise mimic the functions of a flow controller body when installed in the fill port adaptor to permit gas from the oxygen concentrator to be used to replenish a large (for example, stationary) cylinder which would not otherwise fit within the fill port adaptor body 300. Lastly, it is be noted that outlet port 706 may be used to connect via tubing (not shown) the cylinder to which the flow controller body is attached to the patient so that a patient may breathe oxygen enriched air contained in the cylinder by adjusting the flow rate of oxygen enriched air by means of the flow control knob 703. Pressure gauge 701 may be used by the patient to monitor the gas remaining in the cylinder.

I claim:

1. An apparatus for filling a cylinder from a source of pressurized fluid, comprising:

an adaptor having an inlet, a coupling section, said coupling section having an outlet port and a locking mechanism having a locked position and an unlocked position;

a flow controller distinct from a cylinder being filled having a section couplable to said adaptor coupling, said couplable section having an inlet port and an outlet port section, said flow controller being lockable to said adaptor when said locking mechanism is moved to said locked position, said flow controller having an off position in which flow controller outlet port is closed and at least one open position in which flow controller outlet port is open;

a valve mechanism associated with said adaptor outlet port and said flow controller inlet port, said valve mechanism having an open position where the source of pressurized fluid fills the cylinder through said adaptor inlet, said adaptor outlet and said low controller inlet and a closed position where said adaptor can be removed from said flow controller and said flow controller can be moved to said open position to permit fluid to flow from the cylinder through the flow controller to the atmosphere.

2. The apparatus of claim 1, wherein said valve mechanism comprises a first movable member associated with said adaptor outlet port and a second movable member associated with said flow controller inlet port said second movable member normally biased into a closed position.

3. The apparatus of claim 2, further comprising a handle in driven relation with said first movable member, said handle being movable between a closed position and an open position.

4. The apparatus of claim 3, wherein rotation of said handle from said closed position to said open position causes said first movable member to move said second movable member from the normally closed position to an open position thereby allowing fluid to flow from the source of pressurized gas into said cylinder.

5. The apparatus of claim 1, wherein said adaptor coupling section has a complementary shape with said flow controller couplable section.

6. The apparatus of claim 1, wherein said adaptor has a housing portion for receiving a portion of said flow controller.

7. The apparatus of claim 6, wherein said housing portion has an alignment slot and said flow controller has an alignment bar to be received in said alignment slot, said flow controller being in said off position to align said alignment bar with said alignment slot.

8. The apparatus of claim 1, wherein the cylinder is a high pressure cylinder and the pressurized fluid is a gas.

9. The apparatus of claim 1, wherein said locking mechanism comprises a latching clamp for latching said flow controller to said adaptor.

10. The apparatus of claim 1, wherein said flow controller has a port for coupling to said cylinder.

11. A system for filling a cylinder from a source of pressurized fluid, comprising:

an adaptor having an inlet, a coupling section and a locking mechanism having a locked position and an unlocked position; said coupling section having an outlet port;

a flow controller distinct from a cylinder being filled having a section couplable to said adaptor coupling section, said couplable section having an inlet port and an outlet port, said adaptor being lockable to said flow controller when said locking mechanism is moved to said locked position, said flow controller having a closed position in which said flow controller outlet port is closed and at least one open position in which said flow controller outlet port is open, said flow controller having a port in communication with said high pressure cylinder.

12. The system of claim 11, wherein the source of pressurized fluid is an oxygen concentrator.

13. The system of claim 12, wherein said adaptor and said flow controller are arranged such that said flow controller is brought into alignment with said adaptor when coupled thereto.

14. The system of claim 11, wherein said first movable member is movable from a position within said adaptor to a position extending outwardly from said adaptor.

15. The system of claim 11, wherein said first movable member is housed in a movable fill port adaptor.

16. A method of filling a cylinder from a source of pressurized fluid through a flow controller connected to the cylinder, comprising:

locking an adaptor to the flow controller, the adaptor connected at an inlet to the source of pressurized fluid and having an outlet; and opening a valve mechanism by rotating a handle and rotating a pinion and engaging a rack to cause the valve mechanism to open, the valve mechanism located between the outlet of the adaptor and an inlet of the flow controller, thereby allowing pressurized fluid to flow from the source of pressurized fluid through the adaptor and the flow controller into the cylinder.

17. The method of claim 16, further comprising flowing fluid from the flow controller through a pressure regulator and into the cylinder.

18. The method of claim 16, further comprising moving the flow controller to an off position.

19. A system for filling a cylinder and for controlling flow from the cylinder, comprising:

an adaptor having an inlet for coupling to a source of pressurized fluid and a coupling section;

a flow controller having an outlet and a section coupled to said adaptor;

a valve mechanism associated with said adaptor and said flow controller and having an open position where the source of pressurized fluid fills the cylinder and a closed position where said flow controller can be opened to permit fluid to flow from the cylinder through the flow controller to the atmosphere;

wherein said valve mechanism comprises a movable valve and wherein said flow controller has a cooperating movable valve;

a handle connected to said valve mechanism, said handle being movable between a closed position and an open position;

said handle being connected to one of said movable valves and movement of said handle from said closed position to said open position causes said one movable valve to open the other of said movable valves to an open position thereby allowing fluid flow from the source of pressurized fluid into said cylinder; and a rack coupled to said handle and a pinion coupled to one of said movable valves.

20. The system of claim 19, further comprising a pressure regulator connected through a high pressure connection to said cylinder and a low pressure connection in communication with a flow controller inlet.

* * * * *